United States Patent [19]

Ingle et al.

[11] Patent Number: 4,526,769
[45] Date of Patent: Jul. 2, 1985

[54] TRICHLOROSILANE PRODUCTION PROCESS

[75] Inventors: William M. Ingle; Marilyn S. Peffley, both of Phoenix; H. S. Nagaraja Setty, Tempe, all of Ariz.

[73] Assignee: Motorola, Inc., Schaumburg, Ill.

[21] Appl. No.: 514,424

[22] Filed: Jul. 18, 1983

[51] Int. Cl.[3] .............................................. C01B 33/02
[52] U.S. Cl. ....................................... 423/342; 423/350
[58] Field of Search ........................ 423/341, 342, 350

[56] References Cited

U.S. PATENT DOCUMENTS

| 3,148,035 | 9/1964 | Enk | 422/145 |
| 3,681,036 | 8/1972 | Schwarz et al. | 423/342 |
| 4,117,094 | 9/1978 | Blocher, Jr. et al. | 423/342 |

FOREIGN PATENT DOCUMENTS

| 3024319 | 1/1982 | Fed. Rep. of Germany | 423/342 |
| 73617 | 6/1981 | Japan | 423/342 |
| 118017 | 7/1982 | Japan | 423/342 |
| 156318 | 9/1982 | Japan | 423/342 |
| 156319 | 9/1982 | Japan | 423/342 |

OTHER PUBLICATIONS

Mui, J. Y. P., "Investigation of the Hydrochlorination of $SiCl_4$", Final Report, Jet Propulsion Lab, Cal. Inst. Tech., Contract No. 956061, Apr. 1983.

Primary Examiner—L. Dewayne Rutledge
Assistant Examiner—Christopher W. Brody
Attorney, Agent, or Firm—John A. Fisher

[57] ABSTRACT

A process for producing trichlorosilane and equipment for practicing that process are disclosed. The process is a two stage process which combines the reaction of silicon tetrachloride and hydrogen with silicon with the reaction of hydrogen chloride with silicon. In one embodiment of the invention a two stage reactor is provided with a first stage heated to a temperature of about 500°–700° C. and a second stage maintained at a temperature of about 300°–350° C. Each of the first and second stages of the reactor are charged with silicon particles. A mixture comprising hydrogen and silicon tetrachloride are flowed through the silicon particles in the heated first stage to cause a partial hydrogenation of the silicon tetrachloride. The effluent from the first stage includes trichlorosilane and unreacted hydrogen and silicon tetrachloride. Hydrogen chloride is added to this effluent and the mixture of gases are passed through the silicon particles in the second stage of the reactor.

22 Claims, 2 Drawing Figures

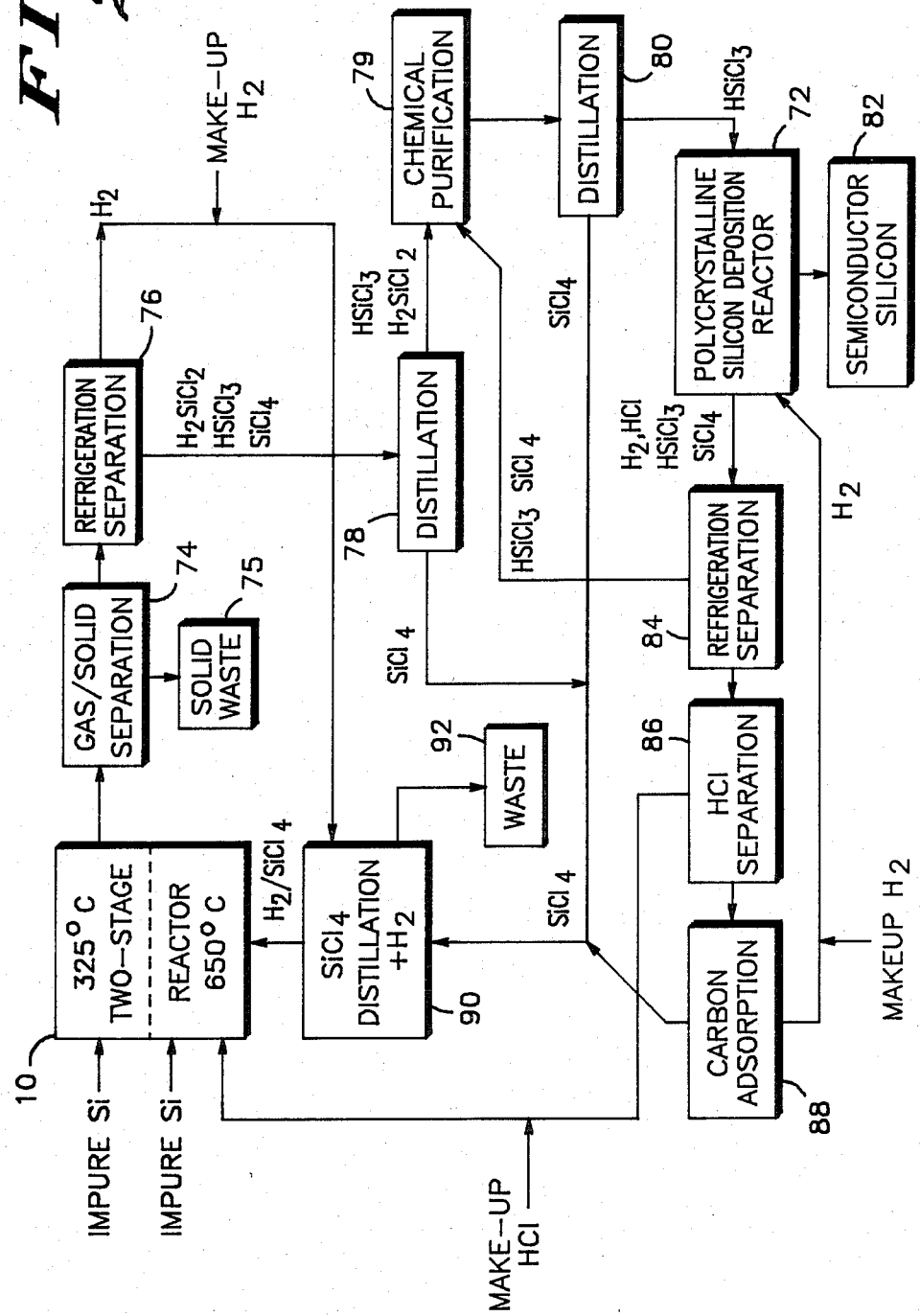

TRICHLOROSILANE PRODUCTION PROCESS

BACKGROUND OF THE INVENTION

This invention relates generally to a process and equipment for producing trichlorosilane ($HSiCl_3$) and to the use of same for producing silicon, and more particularly, to a two stage trichlorosilane production process and equipment and to their incorporation into a closed loop silicon production process.

Nearly all of the high purity silicon used in manufacturing semiconductor devices is produced by chemical vapor deposition from a mixture of trichlorosilane and hydrogen onto hot filaments in a bell jar type reactor according to the reaction $$HSiCl_3 + H_2 \underset{\longleftarrow}{\overset{1050-1200° C.}{\longrightarrow}} Si_{Solid} + SiCl_4 + HCl.$$

The production of silicon in this manner requires large quantities of pure trichlorosilane ($HSiCl_3$), especially in view of the fact that only about ⅓ of the available silicon actually results in silicon deposition. The remaining available silicon is present in the reaction effluent as silicon tetrachloride ($SiCl_4$) or unreacted trichlorosilane. A molar silicon tetrachloride to hydrogen chloride ratio of approximately 2:1 is typical of the effluent from the hot filament type reactor.

Trichlorosilane for the reaction is usually provided by reacting hydrogen chloride with silicon such as metallurgical grade silicon (an impure form of silicon) according to the reaction $$HCl + Si \xrightarrow{230-400° C.} HSiCl_3 + SiCl_4 + H_2.$$

Anhydrous hydrogen chloride is injected into a bed of silicon particles in a fluidized bed type of reactor. After purification, the trichlorosilane produced by this reaction is suitable for high purity silicon production.

While the reaction of HCl with silicon to produce trichlorosilane is, by itself, very efficient, the reaction has a number of limitations, especially as applied to a closed loop production system. First, the reaction does not make use of the silicon tetrachloride which is the by-product of the silicon deposition reaction. In the deposition reaction about 70% by weight of the trichlorosilane input is recovered as silicon tetrachloride. A cost efficient process must recycle this silicon tetrachloride to more efficiently utilize this available silicon. Additionally, the production of semiconductor grade trichlorosilane from the HCl reaction requires extremely pure HCl. Most sources of HCl contain trace amounts of organic contaminants. These organic contaminants are carried through the reaction, are incorporated with the trichlorosilane, and subsequently are incorporated into the deposited silicon as an unwanted impurity. Still further, the reaction of HCl with silicon to produce trichlorosilane is an extremely exothermic reaction and requires heat exchange to minimize overheating. Even with heat exchange, however, hot spots do occur which reduce the trichlorosilane conversion efficiency and degrade the reactor.

The recycling of the $SiCl_4$ by-product is an important consideration in the overall economics of the silicon production process. The by-product $SiCl_4$ is usually hydrolyzed or burned in an oxygen/hydrogen mixture to recover HCl and by-product $SiO_2$. The HCl is then useful as an input to the trichlorosilane production reaction. Thus using the $SiCl_4$, however, is an expensive process and greatly increases the cost of producing $HSiCl_3$.

Trichlorosilane has also been made by the direct hydrogenation of silicon tetrachloride at high temperatures and pressures according to the reaction $$3SiCl_4 + 2H_2 + Si \rightleftharpoons 4HSiCl_3.$$

Conversion efficiencies of about 20-23% have been achieved with this process when operated at 650° C. and 345 kPa using a $H_2/SiCl_4$ ratio of 2:1, a residence time of 1 sec. and with a 5% CuCl catalyst mixed with the silicon.

The cost of trichlorosilane and thus the cost of silicon produced therefrom is a factor in the production cost of any silicon semiconductor device. It is therefore an object of this invention to provide an improved process for the production of trichlorosilane which is more economically feasible than prior art processes.

It is another object of this invention to provide improved equipment for the production of trichlorosilane.

It is yet another object of this invention to provide an improved process for the production of polycrystalline silicon in the form of a closed loop process which efficiently utilizes input reactant materials.

It is a still another object of this invention to provide a process for the production of a higher purity trichlorosilane.

BRIEF SUMMARY OF THE INVENTION

The foregoing and other objects and advantages of the invention are achieved through the use of an improved two stage trichlorosilane production process carried out in an improved reactor and through the incorporation of the two stage process and reactor into a closed loop polycrystalline silicon production process. The process is carried out in a two stage reactor in which the first stage is heated to a temperature of about 500°–700° C. and the second stage is heated to a temperature of about 300°–350° C. Each stage of the reactor is charged with silicon particles. A mixture comprising hydrogen and silicon tetrachloride is flowed through the silicon particles in the first stage to cause a partial hydrogenation of the silicon tetrachloride to produce trichorosilane. The effluent from the first stage includes trichlorosilane, hydrogen, and silicon tetrachloride. To this effluent is added a quantity of hydrogen chloride and the mixture is then passed through the silicon particles in the second stage of the reactor and there reacts to further increase the concentration of trichlorosilane.

BRIEF DESCRIPTION OF THE DRAWINGS

FIG. 2 illustrates, in block diagram form, a closed loop semiconductor grade polycrystalline silicon production process.

DETAILED DESCRIPTION OF THE PREFERRED EMBODIMENTS

Figure 1:
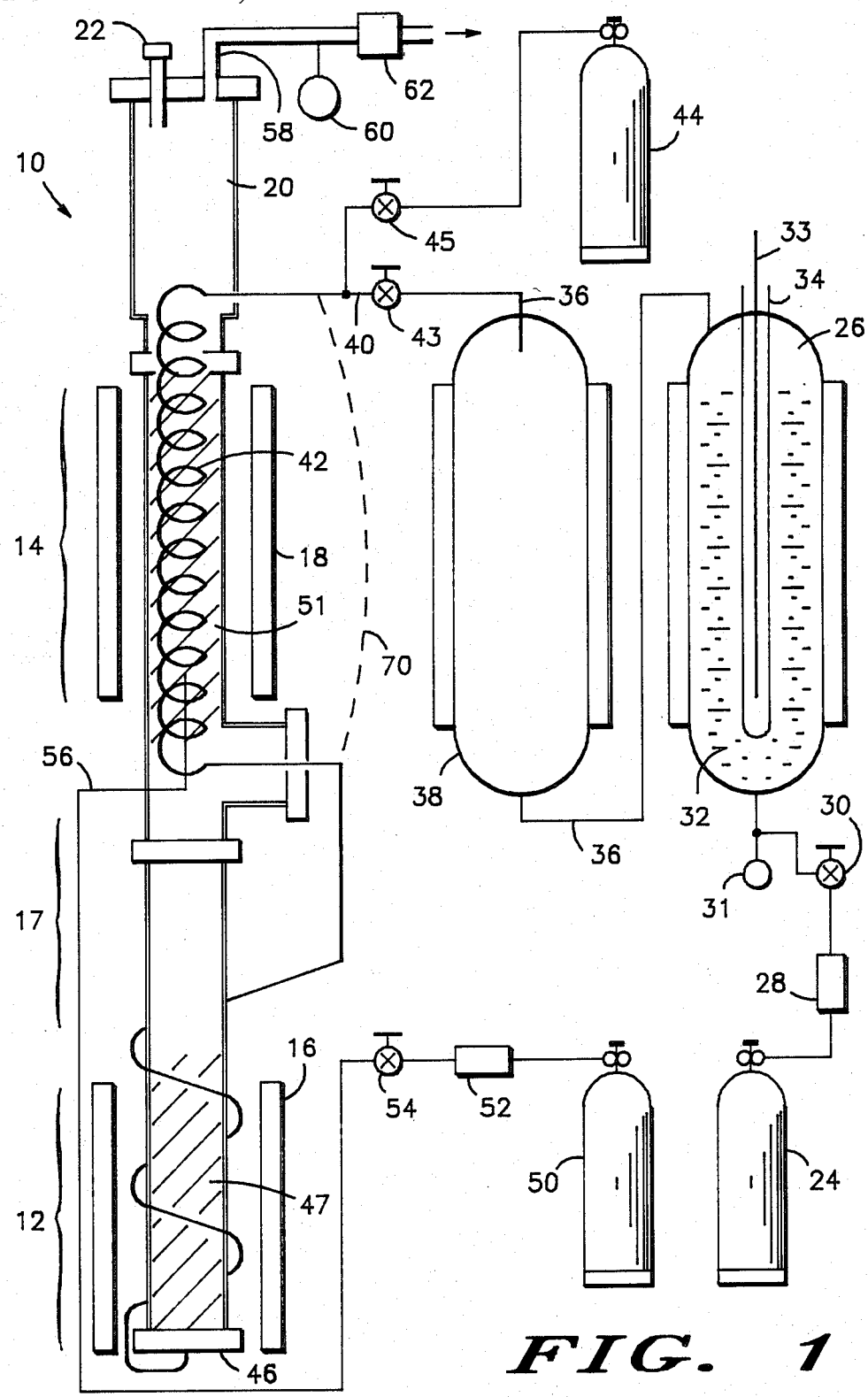
FIG. 1 illustrates a two stage reactor for the production of trichlorosilane in accordance with the invention including reactant flows through the reactor.

As previously noted, most trichlorosilane is produced by the reaction of HCl with silicon according to the reaction

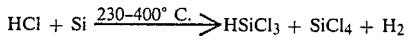

or by the hydrogenation of SiCl$_4$ by the reaction

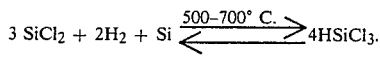

The first reaction results in a typical HSiCl$_3$ product concentration of greater than about 80% whereas the HSiCl$_3$ product concentration in the second reaction, under typical conditions, is only about 20-23%. This difference arises because the first reaction occurs at approximately 230°-400° C. at which temperature range HSiCl$_3$ is thermodynamically stable, whereas the second reaction is conducted at approximately 650° C. at which the HSiCl$_3$ concentration is controlled by thermodynamic equilibrium. That is, at the 650° C. reaction temperature the HSiCl$_3$ product concentration is controlled by the reversible nature of the reaction. If the first reaction is conducted at 650° C., the HSiCl$_3$ product concentration is indistinguishable from that of the second reaction. Thus adding HCl directly to the second reaction at 650° C. does not enhance the conversion efficiency beyond that which is expected for the second reaction alone. Further, if the second reaction is conducted at 230°-400° C., no reaction occurs.

In accordance with the invention a two stage trichlorosilane production process is provided which overcomes the above enumerated problems and utilizes both SiCl$_4$ and HCl by-products produced during the silicon deposition reaction. A two stage reactor 10 for carrying out the process in accordance with the invention is illustrated in FIG. 1. The reactor includes a first stage 12 and a second stage 14. The reactor is constructed of Incoloy ™ alloy 800H, an alloy of nickel, iron, and chromium, or other material having high corrosion resistance and high mechanical strength at the operating reactor temperature. A heater 16 maintains a temperature of about 500°-700° C. in the first stage of the reactor while a heater/cooler 18 maintains a temperature of about 230°-400° C. in the second stage of the reactor. A heat exchange zone 17 separates the first and second stages and provides for the reduction in temperature from the 500°-700° C. of the first stage to the 230°-400° C. of the second stage. A reservoir 20 containing silicon particles maintains both stages of the reactor filled with such particles. The silicon particles are charged to the reactor through an inlet port 22.

In operation, hydrogen from a pressurized hydrogen source 24 is conveyed to a silicon tetrachloride feed tank 26. The flow of hydrogen is monitored and controlled by a mass flow controller 28 and a pneumatic valve 30. A pressure gauge 31 monitors the pressure of the hydrogen as it is bubbled through the silicon tetrachloride 32 contained in feed tank 26. A thermocouple 33 in thermocouple well 34 monitors the temperature of the silicon tetrachloride. By controlling the temperature and pressure within the feed tank the molar ratio of hydrogen to silicon tetrachloride flowing from the tank through tube 36 is controlled. A second silicon tetrachloride feed tank 38 may be used in series with tank 26 to insure a saturated H$_2$/SiCl$_4$ gaseous mixture.

The H$_2$/SiCl$_4$ gas mixture flows through heat traced line 40 and internal heat exchange coil 42 which traverses the length of the second stage. The flow from the feed tanks through line 40 is controlled by a pneumatic valve 43. A nitrogen source 44 supplies compressed nitrogen which can be used to flush the reactor system before the H$_2$/SiCl$_4$ gas mixture is admitted. Nitrogen flow is controlled by a pneumatic valve 45. In an alternative embodiment the H$_2$ and SiCl$_4$ are conveyed to the reactor in separate lines and then mixed in the reactor.

The gas mixture flows through internal heat exchange coil 42 to heat the gas mixture to the second stage temperature. This also serves to moderate the highly exothermic reaction which takes place in the second stage. The heat exchange coil exits the reactor at the bottom of the second stage and from there wraps around the first stage of the reactor within the primary heater 16 and then enters the bottom of the first stage through a fluidized bed distribution plate 46.

The H$_2$/SiCl$_4$ mixture flows upward through the silicon particle bed 47 in the first stage. A portion of the silicon tetrachloride is hydrogenated to form the desired end product trichlorosilane. The gas mixture continues to flow upwardly through the silicon particle bed above heater 16. The gas mixture now contains unreacted silicon tetrachloride and hydrogen as well as trichlorosilane. As the gas mixture passes through heat exchange zone 17 above the heater, the temperature drops about 11° C./cm until the gas mixture reaches the second stage.

At the bottom of the second stage, HCl gas is injected into the second stage silicon bed 51 and mixes with the gas mixture from the first stage reaction. HCl is supplied from a pressurized HCl source 50. The flow of HCl is monitored and controlled by a mass flow controller 52 and pneumatic valve 54. The HCl is conveyed to the bottom of the second stage through tube 56. The gas mixture including HCl passes upwardly through the silicon particle bed of the second stage and the HCl there reacts with the silicon of the bed to produce trichlorosilane and hydrogen. Under these conditions the reaction of HCl with silicon is moderated in comparison with the prior art reaction of HCl and silicon. It is believed that the moderation of the HCl reaction results from: heat exchange with the H$_2$ and SiCl$_4$ conveyed by internal heat exchange coil 42; dilution by and heat exchange with the effluent from the first stage reaction; and especially from the greatly reduced reaction rate of HCl with silicon in the presence of the first stage effluent. The reaction moderation results in the absence of hot spots in the second stage reactor; hot spots have been shown to degrade the reactor, reduce the HSiCl$_3$ conversion efficiency, and to produce undesirable higher molecular weight chlorosilane homologues. The gaseous mixture exits the top of reactor 10 through exhaust port 58. Pressure valve 60 monitors the pressure of the exhaust gas. A needle valve 62 regulates the flow through the reactor and in turn determines the pressure within the reactor. The exhaust gas is collected and then subsequently separated into its constituent parts.

A series of experiments were conducted on the apparatus illustrated in FIG. 1 to determine optimum values for a number of parameters involved in the process in accordance with the invention. The parameters investigated included reactor pressure and temperature, reactant ratio, residence time and the use of a catalyst. The following example is illustrative of those experiments and illustrates preferred modes contemplated by the inventors for the practice of the invention. It is not intended, however, that the invention be limited to this illustrative example.

The apparatus was charged with finely divided metallurgical grade silicon particles mixed with a CuCl catalyst with the catalyst comprising about 2-5% by weight of the total charge. The charge was purged with nitrogen for 60 minutes at a flow rate of about 2 liters per minute. During the purging time the first stage of the reactor was heated to about 650° C. and the second stage to about 325° C. The feed tanks were charged with silicon tetrachloride and then heated to 69° C. The pressure in the SiCl$_4$ tanks was adjusted to about 345 kPa (50 psi). A hydrogen flow rate of about 6.8 l/min through the silicon tetrachloride tanks was established and a 2:1 ratio of hydrogen to silicon tetrachloride was achieved. A flow of this gas mixture was maintained through the heated reactor and the effluent from the reactor was analyzed by gas chromotography (G.C.). The G.C. analysis revealed a 20.5% conversion efficiency. An HCl flow of 0.85 liters per minute was then initiated into the second stage. G.C. analysis of the total reactor effluent (first and second stages combined) indicated that the trichlorosilane concentration had increased to 23.5% of the chlorosilane fraction. No unreacted HCl was observed. The HCl flow rate was then increased to 1.7 liters per minute. G.C. analysis of the total reactor effluent indicated that the trichlorosilane had increased to 25.3% of the total chlorosilane fraction; again no HCl was observed. The HCl flow rate was further increased to 2.56 liters per minute. Repeated G.C. analysis on the total reactor effluent indicated a trichlorosilane conversion efficiency of 33.3%. A calculation of the theoretical yield for the HCl reaction in the second stage of the two stage reactor indicates that the trichlorosilane conversion efficiency was equal to 100% of the HCl reacted. At HCl flow rates of about 5 l/min (50% by volume of the total gaseous flow) the HCl to HSiCl$_3$ conversion efficiency of 99-100% was maintained. Because of the highly exothermic nature of the reaction, however, external cooling was required to maintain a temperature near 325° C. in the second stage of the reactor.

Tests similar to the above were performed, except that the temperature of the second stage reactor was varied. When the second stage reactor zone was below approximately 300° C., HCl was detected in the reactor effluent accompanied by a decrease in percent HSiCl$_3$. When the temperature of the second stage rose above about 350° C., SiCl$_4$ was formed from the HCl reacting with HSiCl$_3$ with a corresponding loss of percent HSiCl$_3$. The process, in accordance with the invention, was thus operated with the second stage at 300°-350° C.; optimum results were achieved when the second stage of the reactor was maintained at about 325° C.±15° C.

For a small scale reactor, some problems were encountered when attempting to maintain a fluidized particle bed in the second stage of the reactor. This problem was caused in part by the presence of the heat exchange coil 42 which restricted the mobility of the silicon particles within the stage. Tests were conducted using a modified reactor with the reactor modification indicated by the dotted line 70 in FIG. 1. By this modification the heat exchange coil was removed from the second stage and the mixture of hydrogen and silicon tetrachloride was conveyed directly to the first stage of the reactor through tube 71. Tests using this modification were run using conditions otherwise the same as those described above. Conversion efficiency of 21% was observed without injecting HCl, and this efficiency increased to 33.0% when 25% HCl was added. The removal of the internal heat exchange coil located within the second stage did not have a major effect on the overall HSiCl$_3$ conversion efficiency, but extra temperature control (cooling) was required to maintain the internal reactor second stage temperature at 325° C.±15° C.

Further tests were conducted to determine the effect of various parameters on conversion efficiency and trichlorosilane throughput. It was determined that over the first stage temperature range of 525° C. to 650° C. both higher conversion efficiency and higher trichlorosilane throughput were observed at higher temperatures (650° C.>600° C.>550° C.>525° C.). Preferably the temperature of the first stage is maintained at about 550°-650° C. The H$_2$/SiCl$_4$ ratio was found to affect conversion efficiency (3:1>2:1>1:1) and HSiCl$_3$ throughput (1:1≅2:1>3:1). Both conversion efficiency and HSiCl$_3$ throughput were improved by the use of a CuCl catalyst mixed with the silicon particles. The CuCl comprises about 1-10 weight percent of the total charge, and preferably about 2-5 weight percent. Tests were also run to examine the effect of ambient pressure within the reactor over the range of pressures from about 34 kPa (5 psi) to about 3450 kPa (500 psi). Conversion efficiency was found to increase with increasing pressure, but the enhanced reaction rates at lower pressures had a compensating effect so that similar HSiCl$_3$ production rates were observed at all pressures. It is preferred to operate the two stage reactor in accordance with the invention at a pressure of about 170-415 kPa, and especially at a pressure of about 345 kPa. Higher pressures than this require an increased expenditure of energy to compress the reactant gases and lower pressures require residence times considerably shorter than those needed to maintain a fluidized bed and achieve a high HSiCl$_3$ production throughput. In addition, shorter residence times for reactants in the first stage were shown to increase HSiCl$_3$ throughput, but only at the expense of HSiCl$_3$ conversion efficiency. At longer residence times, high conversion efficiencies for HSiCl$_3$ are obtained.

The process and apparatus described above, in accordance with the invention, provide for the production of trichlorosilane using HCl and SiCl$_4$ as input reactants. These two reactants are by-products of the normal reaction by which silicon is produced by chemical vapor deposition. FIG. 2 illustrates in block diagram form a further embodiment of the invention wherein the trichlorosilane production reaction and reactor are incorporated into a closed loop silicon deposition system. Central to the closed loop polycrystalline silicon production system is a two stage trichlorosilane reactor 10 and a polycrystalline silicon deposition reactor 72. Inputs to the two stage reactor, as above, preferably include metallurgical grade silicon, CuCl catalyst, HCl, and a mixture of H$_2$ and SiCl$_4$. The effluent from reactor 10 includes unreacted H$_2$ and SiCl$_4$ plus HSiCl$_3$ produced in the reactor. Some solid silicon is also carried along by the gaseous effluent. The effluent is directed to a gas/solid separator 74 which effects the removal of the solid waste from the effluent. Solid wastes 75 are discarded. The gaseous effluent is compressed and cooled in refrigeration separator 76 where H$_2$ is separated from the liquid chlorosilanes (HSiCl$_3$, SiCl$_4$, H$_2$SiCl$_2$). The hydrogen gas is recycled back to reactor 10 together with an additional quantity of makeup hydrogen and SiCl$_4$. The chlorosilanes are separated by distillation in distillation column 78 which separates the lighter boiling constituents (H$_2$SiCl$_2$ and HSiCl$_3$) from the SiCl$_4$. The lighter boiling distillates are further purified by chemical purification 79 and simple distillation 80. The resultant pure trichlorosilane is used as an input to the polycrystalline silicon deposition reactor 72 along with hydrogen. Semiconductor grade polycrystalline silicon 82 is deposited on heated filaments in the deposition reactor. The effluent from reactor 72 includes unreacted H$_2$ and HSiCl$_3$ together with SiCl$_4$ and HCl. The effluent is separated by refrigeration 84 with the silicon bearing reactants being cycled back to chemical purification 79. The non-silicon bearing reactants enter refrigeration unit 86 which removes most of the HCl. The HCl is recycled back to the dual stage reactor 10. Carbon beds 88 remove the final traces of HCl and chlorosilanes from the H$_2$ which is then recycled back into the polycrystalline silicon deposition reactor 72. Silicon tetrachloride from distillation columns 78 and 80 are further purified by distillation in distillation column 90. Wastes 92 are discarded and the purified SiCl$_4$ is mixed together with H$_2$ to form an input to the two stage reactor 10. The closed loop system thus requires metallurgical grade silicon, makeup HCl and makeup H$_2$ as inputs. The reactants from the polycrystalline silicon deposition reactor are recycled and utilized in the production of trichlorosilane. The closed loop system thus makes optimum use of the silicon bearing reactants and the purified HCl and H$_2$.

Thus it is apparent that there has been provided, in accordance with the invention, a process and reactor for the production of trichlorosilane and a closed loop silicon production system incorporating the same which meet the objects and advantages set forth above. The invention has been described and illustrated with reference to certain specific embodiments thereof, but it is not intended that the invention be so limited. Those skilled in the art will recognize, after consideration of the foregoing detailed description, that variations and modifications differing from these illustrative embodiments are possible. For example, a two stage reactor utilizing scrap semiconductor grade silicon with high purity H$_2$, HCl and SiCl$_4$ (with or without a noncontaminating catalyst) can directly produce semiconductor grade HSiCl$_3$ without the need for repetitive distillation/purification steps. It is intended that all such variations and modifications as fall within the spirit and scope of the invention be included within the appended claims.

We claim:

1. A process for producing HSiCl$_3$ which comprises the steps of:
   providing a two stage reactor, the first stage of said reactor maintained at a temperature of about 500°–700° C. and the second stage of said reactor maintained at a temperature of about 300°–350° C.;
   charging each of said first and second stages with silicon particles;
   flowing a mixture comprising H$_2$ and SiCl$_4$ through said silicon particles in said first stage and reacting said H$_2$, SiCl$_4$, and silicon to cause a partial hydrogenation of said SiCl$_4$;
   adding HCl to the effluent from said first stage and passing said effluent and HCl through said silicon particles in said second stage.

2. The process of claim 1 wherein said first stage is heated to a temperature of about 550°–650° C.

3. The process of claim 2 wherein said first stage is heated to a temperature of about 650° C.

4. The process of claim 1 wherein said second stage is maintained at a temperature of about 310°–340° C.

5. The process of claim 4 wherein said second stage is maintained at a temperature of about 325° C.

6. The process of claim 1 wherein said silicon particles are admixed with a catalyst.

7. The process of claim 6 wherein said catalyst comprises CuCl.

8. The process of claim 7 wherein said catalyst comprises CuCl in an amount of about 1–10 percent by weight of the total charge.

9. The process of claim 7 wherein said catalyst comprises CuCl in an amount of about 2–5 percent by weight of the total charge.

10. The process of claim 1 wherein said H$_2$ and SiCl$_4$ are in a ratio of about 3:1 to about 1:1.

11. The process of claim 10 wherein said H$_2$ and SiCl$_4$ are in a ratio of about 2:1.

12. The process of claim 1 wherein HCl is added to said effluent in an amount equal to about 0–50 percent by volume of the total gaseous flow through said second stage.

13. The process of claim 12 wherein said HCl comprises about 25% by volume of the total gaseous flow through said second stage.

14. The process of claim 1 wherein pressure within said reactor is maintained at about 5–500 psi (43 kPa–3450 kPa).

15. The process of claim 14 wherein pressure in said reactor is maintained at about 25–60 psi (170 kPa–415 kPa).

16. A process for producing trichlorosilane which comprises the steps of: providing a reactor having a first stage heated to about 550°–650° C. and a second stage maintained at about 310°–340° C.; charging each of said first and second stages with silicon particles; flowing a mixture comprising hydrogen and silicon tetrachloride in a ratio of about 1:1 to about 3:1 through said silicon particles in said first stage and therein reacting said silicon, hydrogen, and silicon tetrachloride; adding hydrogen chloride to the effluent flowing from said first stage; flowing said hydrogen chloride and said effluent through said silicon particles in said second stage; and collecting the effluent flowing from said second stage.

17. The process of claim 16 further comprising the step of controlling the pressure in said reactor at about 170 kPa to about 415 kPa.

18. The process of claim 16 wherein said charge of silicon particles further comprises 1–10 percent by weight of CuCl.

19. The process of claim 16 wherein said charge of silicon particles further comprises about 2–5 percent by weight of CuCl.

20. The process of claim 16 further comprising the step of flowing said mixture comprising hydrogen and silicon tetrachloride through a heat exchanger in said second stage prior to flowing said mixture through said silicon particles in said first stage.

21. A closed loop process for producing silicon which comprises the steps of reacting in a first reaction H$_2$, SiCl$_4$ and silicon at a temperature of about 500°–700° C.; reacting in a second reaction HCl plus the effluent from said first reaction with silicon, said first and second reactions producing HSiCl$_3$; in a silicon deposition reactor reacting said HSiCl$_3$ plus H$_2$ to deposit silicon with HCl and SiCl$_4$ produced as by-products; and conveying said by-product SiCl$_4$ to said first reaction and said by-product HCl to said second reaction.

22. A closed loop process for producing silicon which comprises the steps of: providing a two stage reactor for producing trichlorosilane; reacting in a first stage of said reactor hydrogen, silicon tetrachloride and silicon to produce reaction products including trichlorosilane; reacting in a second stage of said reactor hydrogen chloride plus said reaction products with silicon to produce additional trichlorosilane; conveying trichlorosilane from said two stage reactor to a silicon deposition reactor and therein reacting said trichlorosilane with hydrogen to deposit silicon with silicon tetrachloride and hydrogen chloride formed as by-products; conveying said silicon tetrachloride and hydrogen chloride by-products to said first and second stages of said reactor, respectively.

* * * * *